United States Patent
Lee

(10) Patent No.: US 8,691,428 B2
(45) Date of Patent: Apr. 8, 2014

(54) BATTERY PACK COMPRISING THREE CASE COVERINGS

(75) Inventor: Wonil Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 396 days.

(21) Appl. No.: 13/072,632

(22) Filed: Mar. 25, 2011

(65) Prior Publication Data

US 2012/0034495 A1 Feb. 9, 2012

(30) Foreign Application Priority Data

Aug. 6, 2010 (KR) ........................ 10-2010-0075834

(51) Int. Cl.
*H01M 2/02* (2006.01)
*H01M 10/02* (2006.01)
*H01M 14/00* (2006.01)

(52) U.S. Cl.
USPC ................................ 429/177; 429/164; 429/7

(58) Field of Classification Search
USPC .............. 429/7, 160, 161, 162, 163, 164, 177
See application file for complete search history.

(56) References Cited

U.S. PATENT DOCUMENTS

| | | | | |
|---|---|---|---|---|
| 4,974,130 | A * | 11/1990 | Friedman | 362/199 |
| 2004/0007348 | A1 * | 1/2004 | Stoller | 165/47 |
| 2008/0220320 | A1 * | 9/2008 | Horikoshi et al. | 429/82 |
| 2008/0254350 | A1 | 10/2008 | Moon | |
| 2008/0292956 | A1 * | 11/2008 | Hong et al. | 429/164 |
| 2009/0072785 | A1 | 3/2009 | Moon | |
| 2009/0280401 | A1 | 11/2009 | Kim | |
| 2010/0075216 | A1 | 3/2010 | Yoo | |

FOREIGN PATENT DOCUMENTS

| | | | | | |
|---|---|---|---|---|---|
| CN | 101677133 A | * | 3/2010 | | H01M 6/42 |
| FR | 2335122 | * | 8/1977 | | H05K 5/02 |
| JP | 7122249 | | 5/1995 | | |
| KR | 10-2001-0028714 A | | 4/2001 | | |
| KR | 20-0404743 | | 12/2005 | | |
| KR | 10-2008-0092176 A | | 10/2008 | | |
| KR | 10-2009-0029148 A | | 3/2009 | | |
| KR | 10-2009-0117362 A | | 11/2009 | | |
| KR | 1020090118197 | | 11/2009 | | |
| KR | 1020100033041 | | 3/2010 | | |

OTHER PUBLICATIONS

Machine Translation of: KR 1020090118197A, Cho et al., Nov. 18, 2009.*
Office Action dated Oct. 24, 2011 for corresponding KR application No. 10-2010-0075834.
Office Action dated Apr. 29, 2012 for corresponding KR Application No. 10-2010-0075834.

* cited by examiner

*Primary Examiner* — Kenneth Douyette
(74) *Attorney, Agent, or Firm* — Knobbe, Martens, Olson & Bear, LLP

(57) ABSTRACT

A battery pack comprises a battery cell, a circuit module electrically connected to the battery cell, a first case covering one side of the battery cell, a second case covering an opposite side of the battery cell and one side of the circuit module, wherein the second case is coupled to the first case, and a third case covering an opposite side of the circuit module, wherein the third case is coupled to the first case and the second case.

19 Claims, 4 Drawing Sheets

BATTERY PACK COMPRISING THREE CASE COVERINGS

CROSS-REFERENCE TO RELATED APPLICATIONS

This application claims the benefit of Korean Patent Application No. 10-2010-0075834 filed on Aug. 6, 2010, the content of which is incorporated herein by reference in its entirety.

BACKGROUND

1. Field

Aspects of the present invention relate to a battery pack.

2. Description of the Related Technology

An external battery pack used in portable electronic devices such as personal digital assistants (PDA's), camcorders or the like, is generally manufactured by combining multiple battery cells due to limited capacity of a unit battery cell.

The battery pack typically includes a first case, a second case coupled to the first case, a plurality of battery cells accommodated in a space formed by the first case and the second case, and a protective circuit board installed at one side of the battery cells and controlling charging and discharging operations. The battery pack is typically mounted in an external electronic device such as a notebook computer, a PDA, or a camcorder to supply a predetermined power to the external electronic device.

SUMMARY

Aspects of the present invention provide a battery pack configured to conceal coupling lines when it is mounted in an external electronic device, thereby offering a neat exterior appearance design to the external electronic device.

According to aspects of the present invention, a battery pack comprises at least one battery cell, a circuit module electrically connected to the battery cell, a first case covering one side of the battery cell, a second case covering an opposite side of the battery cell and one side of the circuit module, wherein the second case is coupled to the first case, and a third case covering an opposite side of the circuit module, wherein the third case is coupled to the first case and the second case.

The first case may have a continuous side surface.

The side surface of the first case may be exposed when the battery pack is mounted in an external electronic device.

A coupling line that couples the first case and the second case may be located below or above the third case.

The third case may comprise a barrier wall formed at a portion of a contact region where the third case contact the first case.

The battery pack may further include a label attached to a portion of the coupling line that couples the second case and the third case.

The second case may include a first protruding part formed at one side, the third case may include a second protruding part formed at one side, the circuit module may be accommodated in a protruding space formed by coupling the second protruding part and the third protruding part, and a connector of the circuit module may be exposed through one side of the protruding part.

The battery cell may comprise a cylindrical lithium ion battery.

The first case may include a first fastening hole formed at a region where the first case and the second case are coupled to each other, and a first fastening protrusion formed at a region where the first case and the third case are coupled to each other.

The first case may include a base surface, a long side surface bent and extending from an edge of the first base surface, a short side surface connected to the base surface and the long side surface, a long side extending surface extending from the long side surface, a facing surface facing the long side surface and bent and extending from an edge of the base surface, and a facing extending surface extending from the facing surface.

The first fastening hole may be formed on the first long side extending surface, and the first fastening protrusion may be formed in the first facing extending surface.

The second case may include a first fastening hook formed at a region where the second case and the first case are coupled to each other, and a second fastening hook and rib hole formed at a region where the second case and the third case are coupled to each other.

The second case may include a base surface, a long side surface bent and extending from an edge of the base surface, a short side surface connected to the base surface and the long side surface, and a protruding part protruding outwardly at one side of the long side surface and having protruding surfaces connected to the long side surface and the short side surface.

The second case may include a label receiving groove formed in the long side surface.

The first fastening hook may be formed at the second short side surface and the second fastening hook may be formed at the second long side surface, and the rib hole may be formed in a rib surface parallel with the protruding surfaces.

The third case may include a receiving opening and a receiving hole formed at a region where the third case is coupled to the first case, and a fastening hole and a fastening hook formed at a region where the third case is coupled to the second case.

The third case may include a base surface, a long side surface extending from an edge of the base surface, an extending surface extending from an edge of the long side surface and forming a stepped portion with respect to the long side surface, and a protruding part formed to protrude outwardly at one side of the long side surface and the extending surface and consisting of protruding surfaces connected to the long side surface, the extending surface and the base surface.

The third case may include a label receiving groove formed in the long side surface.

The receiving opening and the receiving hole may be formed in the base surface, the fastening hole may be formed in the third extending surface, and the fastening hook may be formed in the protruding surfaces.

As described above, since the battery pack according to embodiments of the present invention comprises a first case having a seamless, continuous side surface, a second case, and a third case, a coupling line created when the battery pack is mounted in an external electronic device is not exposed, thereby offering a neat exterior appearance design to the external electronic device.

Additionally, in the battery pack according to the embodiment of the present invention, because a first case which may have a complicated structure and a third case can be separately formed to be subsequently coupled to each other, a mold can be easily separated from the first case even after injection-molding the first case.

Additional aspects and/or advantages of the invention will be set forth in part in the description which follows and in part will be obvious from the description or may be learned by practice of the invention.

BRIEF DESCRIPTION OF THE DRAWINGS

Aspects, features and advantages of the present invention will be more apparent from the following detailed description in conjunction with the accompanying drawings, in which.

DETAILED DESCRIPTION

The present invention will now be described in detail with reference to certain embodiments thereof.

Figure 1:
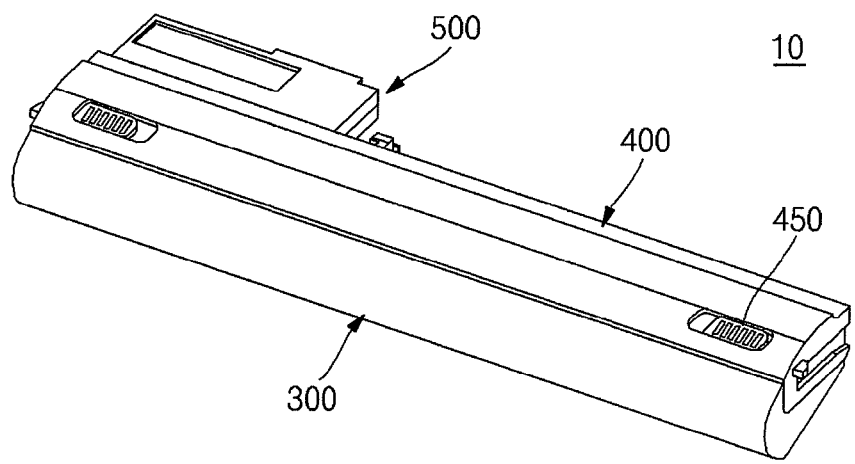
FIG. 1 is an assembled perspective view of a battery pack according to an embodiment of the present invention.
Figure 2:
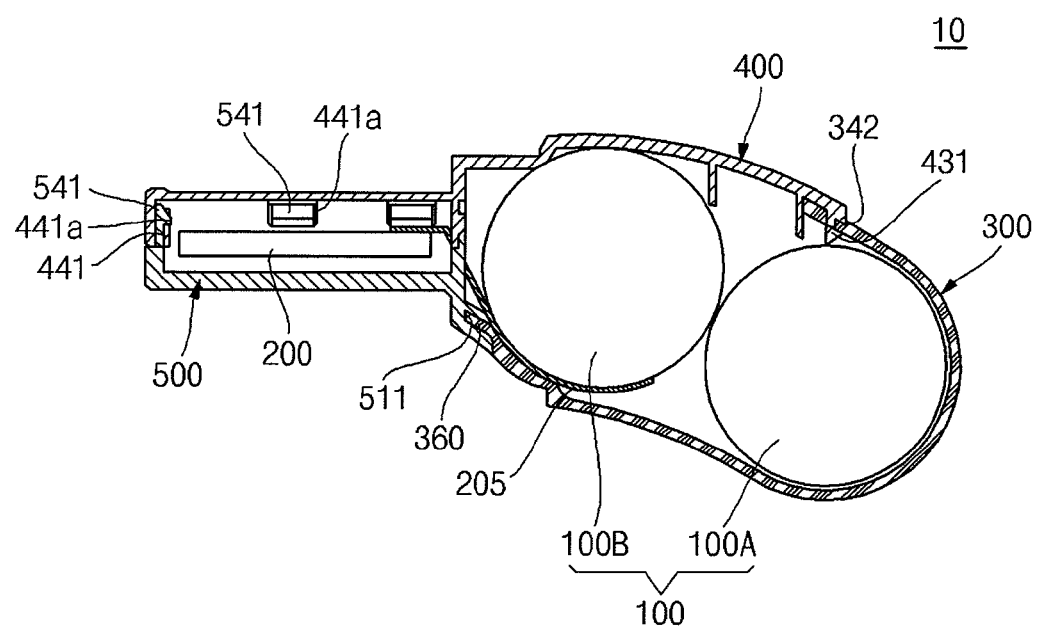
FIG. 2 is a cross-sectional view of a protruding part of the battery pack shown in FIG. 1.

FIG. 1 is an assembled perspective view of a battery pack according to an embodiment of the present invention, and FIG. 2 is a cross-sectional view of a protruding part of the battery pack shown in FIG. 1.

Referring to FIGS. 1 and 2, the battery pack 10 according to an embodiment of the present invention includes at least one battery cell 100, a circuit module 200, a first case 300, a second case 400, and a third case 500. The battery pack 10 is widely used as a power supply in a state in which it is mounted in an external electronic device, such as a notebook computer. Here, the battery pack 10 shown in FIG. 1 may be accommodated in an upside-down state in a battery pack receiving space formed along side surfaces and a bottom surface of the external electronic device.

Figure 6:
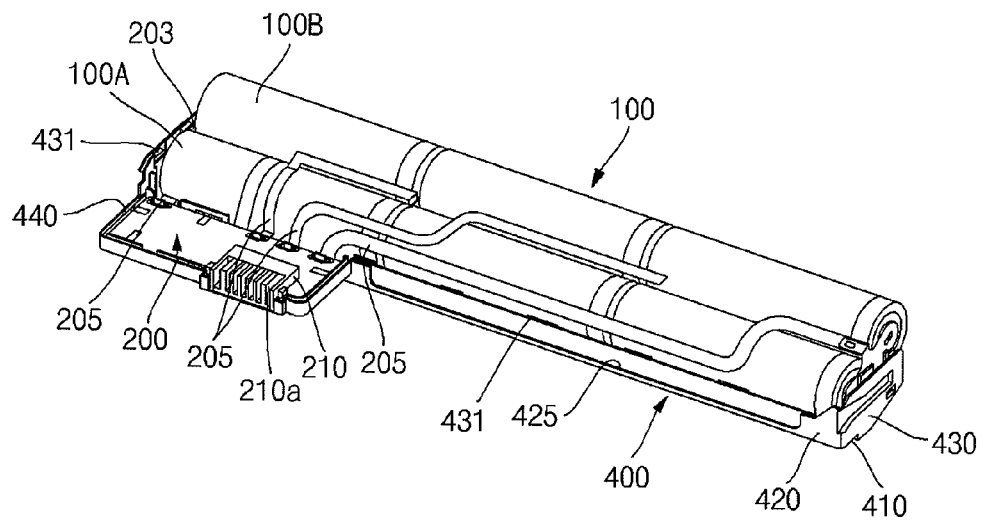
FIG. 6 is a perspective view illustrating an arranged state in which a battery cell and a circuit module are arranged in a second case of the battery pack shown in FIG. 3.

The battery cell 100 is a chargeable/dischargeable battery and may be implemented as a cylindrical lithium secondary battery having a high operating voltage and a high energy density per unit weight. Although the battery cell 100 shown in FIG. 2 includes a first battery cell 100A and a second battery cell 100B, it may include, but is not limited to, six unit cells, as shown in FIG. 6. Meanwhile, the first battery cell 100A and the second battery cell 100B may be electrically connected to each other through a connection member (203 of FIG. 6).

The circuit module 200 may be electrically connected to the battery cell 100 through a conductive member 205. The circuit module 200 may include a circuit board having a circuit (not shown) controlling charging and discharging of the battery cell 100, or a protection circuit (not shown) preventing over-charging and over-discharging of the battery cell 100. The circuit module 200 may also include a connector (210 of FIG. 6) installed at one side to electrically connect the circuit board and the external electronic device to each other.

The first case 300, the second case 400 and the third case 500 may be formed to receive the battery cell 100 and the circuit module 200. The first case 300, the second case 400 and the third case 500 may be formed such that coupling lines, which are created when the respective cases 300, 400 and 500 are coupled to one another, are not viewed by a user when the battery pack 10 is mounted in the external electronic device, thereby achieving a visually favorable exterior appearance.

The first case 300, the second case 400 and the third case 500 will now be described in detail.

Figure 3:
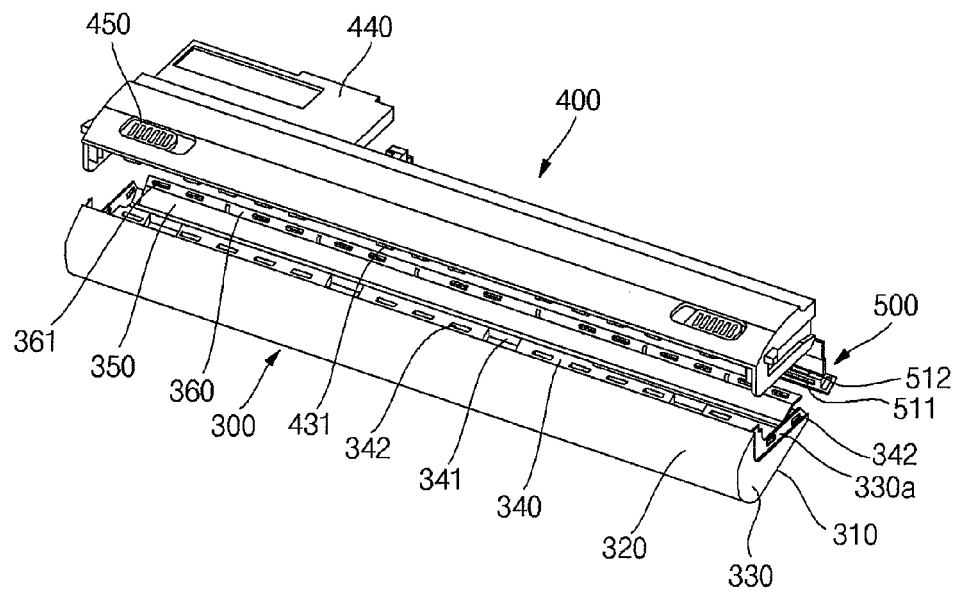
FIG. 3 is an exploded perspective view of the battery pack shown in FIG. 1.
Figure 4:
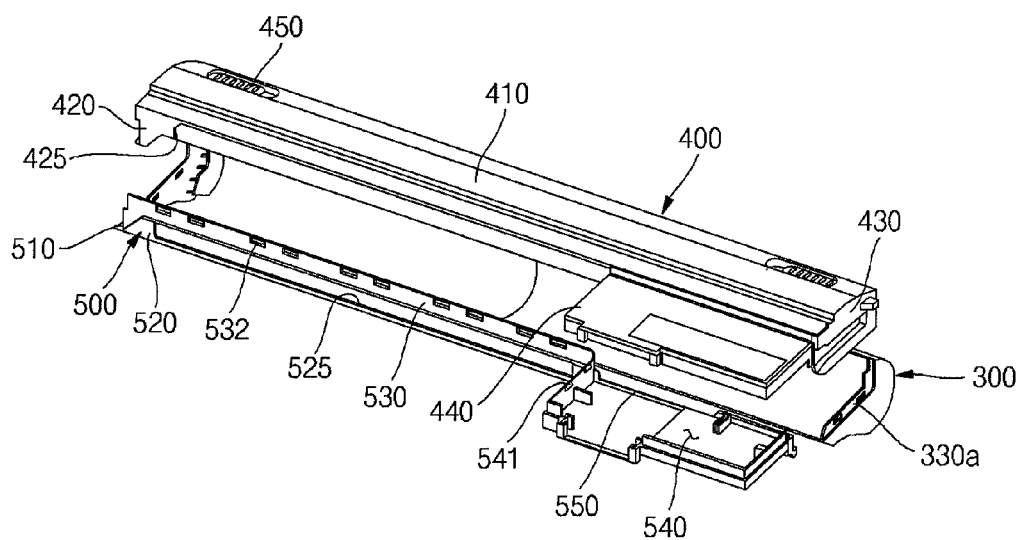
FIG. 4 is an exploded perspective view of the battery pack shown in FIG. 3, viewed from a different direction.
Figure 5:
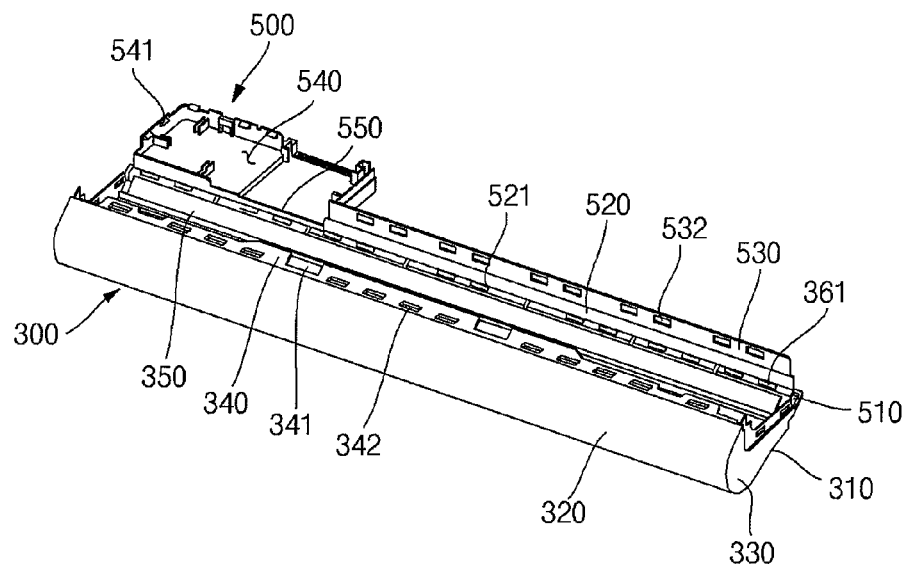
FIG. 5 is a perspective view illustrating an assembled state in which a first case and a third case of the battery pack shown in FIG. 3, excluding a second case, are assembled.

FIG. 3 is an exploded perspective view of the battery pack shown in FIG. 1; FIG. 4 is an exploded perspective view of the battery pack shown in FIG. 3, viewed in a different direction; FIG. 5 is a perspective view illustrating an assembled state in which a first case and a third case of the battery pack shown in FIG. 3, excluding a second case, are assembled; FIG. 6 is a perspective view illustrating an arranged state in which a battery cell and a circuit module are arranged in a second case of the battery pack shown in FIG. 3.

Referring to FIGS. 3 through 6, the first case 300 may be formed to cover one side of the battery cell 100, for example, one side of the first battery cell 100A. In the illustrated embodiment, a side surface of the first case 300 contacting one side of the battery cell 100 is a continuous surface, and may have a shape corresponding to that of one side of the battery cell 100. The side surface of the first case 300 may be a surface revealed when the battery pack 10 is mounted in the external electronic device.

Specifically, the first case 300 may include a first base surface 310, a first long side surface 320, a first short side surface 330, a first long side extending surface 340, a first facing surface 350, and a first facing extending surface 360.

The first base surface 310 may form a base of the first case 300, and may contact, for example, the first battery cell 100A and the second battery cell 100B disposed in parallel with the first battery cell 100A.

The first long side surface 320 may be bent and extend from an edge of the first base surface 310. The first long side surface 320 may be substantially a continuous surface extending from the first case 300 and may be a surface revealed when the battery pack 10 is mounted in the external electronic device. Here, the first long side surface 320 may be a surface extending from a first edge having the longest length among the edges of the base surface 310.

The first short side surface 330 may be a surface connected to the first base surface 310 and the first long side surface 320. Here, the first short side surface 330 may extend from second and third edges having shorter lengths among the edges of the first base surface 310. In addition, the first short side surface 330 may have a stepped portion 330a so that a portion of the second case 400 is accommodated therein.

The first long side extending surface 340 may be a surface extending from the first long side surface 320 and may be coupled to the second case 400. Accordingly, the first long side extending surface 340 may have a first coupling groove 341 and first fastening holes 342 for coupling the first case 300 and the second case 400 to each other. The first fastening holes 342 may also be formed in the first short side surface 330. The first fastening holes 342 may be engaged with second fastening hooks 431 of the second case 400.

The first facing surface 350 may face the first long side surface 320 and may be bent and extend from the fourth edge of the first base surface 310. In the first base surface 310, the first edge and the fourth edge may be parallel with each other and the second edge and the third edge may be parallel with each other.

The first extending surface 360 may be a surface extending from the first facing surface 350 and may be coupled to the third case 500. Accordingly, the first facing extending surface 360 may have a first fastening protrusion 361 for coupling the first case 300 and the third case 500 to each other. Here, the first facing extending surface 360 may have a thickness smaller than that of the first facing surface 350 and may be coupled to a third receiving opening 511 of the third case 500. In addition, the first fastening protrusion 361 may be coupled to a third receiving hole 512 of the third case 500.

The second case 400 may be formed to cover the other side of the battery cell 100, and one side of the circuit module 200, and may be coupled to the first case 300. Here, a coupling line that couples the second case 400 and the first case 300 may be positioned below or above the third case 500. This is for the purpose of making the coupling line of the second case 400 and the first case 300 not viewable by a user when the battery pack 10 is accommodated in a battery pack receiving space formed along the side and bottom surfaces of an external electronic device.

Specifically, the second case 400 may include a second base surface 410, a second long side surface 420, a second short side surface 430, a second protruding part 440, and a second fixing part 450.

The second base surface 410 may form a base of the second case 400, and may cover, for example, the other side of the first battery cell 100A, the second battery cell 100B and one side of the circuit module 200. Here, one side of the circuit module 200 may be a surface of the circuit module 200, through which a metal terminal 210a of the connector 210 is not exposed.

The second long side surface 420 may be bent and may extend from an edge of the second base surface 410. Here, the second long side surface 420 may be a surface extending from the first edge having the greatest length among the edges of the base surface 410. Meanwhile, the second long side surface 420 may have a second label receiving groove 425.

The second short side surface 430 may be a side surface connected to the second base surface 410 and the second long side surface 420. Here, the second short side surface 430 may extend from second and third edges having shorter lengths among the edges of the second base surface 410. The second short side surface 430 may be coupled to the stepped portion 330a of the first case 300. Here, the second short side surface 430 may have second fastening hooks 431 for coupling the first case 300 and the second case 400 to each other. The second fastening hooks 431 may be engaged with the first fastening holes 342 of the first case 300. Meanwhile, the second fastening hooks 431 may also be formed in the second long side surface 420 to couple the third case 500 and the second case 400 to each other. Here, the second fastening hooks 431 may be engaged with third fastening holes 532 of the third case 500.

The second protruding part 440 may be formed to protrude outwardly at one second long side surface 420, and may consist of protruding surfaces connected to the second long side surface 420 and the second short side surface 430. The second protruding part 440 may provide for a space for receiving the circuit module 200 having the connector 210. Here, the second protruding part 440 may include second rib holes (441a of FIG. 2) formed in the second rib surface (441 of FIG. 2) parallel with the protruding surfaces for coupling the third protruding part 540 and the second protruding part 440 to each other. The second rib holes 441a are engaged with third fastening hooks 541 of the third case 500.

The second fixing part 450 may be disposed at the outside of the second base surface 410, and can control attachment or detachment of the battery pack 10 mounted in an external electronic device. The second fixing part 450 may be configured in the form of a button moving right and left.

The third case 500 may be formed to cover the other side of the circuit module 200 and may be coupled to the first case 300 and the second case 400. The shape in which the third case 500 and the first case 300 are coupled to each other may substantially correspond to that of the second case 400. Here, it is quite difficult to form only the first case 300 corresponding to the second case 400 in view of injection molding. That is to say, since an internal structure of the first case 300 is complicated, when the first case 300 is formed so as to correspond to the second case 400, it is difficult to separate a mold from the first case 300 once the first case 300 is formed. Accordingly, first case 300 and the third case 500 may be separately formed such that the shapes in which the third case 500 and the first case 300 are coupled to each other may correspond to the shape of the second case 400.

In detail, the third case 500 may include a third base surface 510, a third long side surface 520, a third extending surface 530, and a third protruding part 540.

The third base surface 510 forms a base of the third case 500. The third base surface 510 may have a third receiving opening 511 and a third receiving hole 512 for coupling the first case 300 and the third case 500 to each other. The third receiving opening 511 may be engaged with the first long side extending surface 360 of the first case 300, and the third receiving hole 512 may be engaged with the first fastening protrusion 361 of the first case 300.

The third long side surface 520 may be bent and extend from an edge of the third base surface 510. The third long side surface 520 may have a third label receiving groove 525, and the third label receiving groove 525 may provide for a space for receiving a label 600 to be described later together with the second label receiving groove 425.

The third extending surface 530 may extend from an edge of the third long side surface 520, and form a stepped portion with respect to the third long side surface 520. The third extending surface 530 may have third fastening holes 532 for coupling the second case 400 and the third case 500 to each other. The third fastening holes 532 may be engaged with the second fastening hooks 431 of the second case 400.

The third protruding part 540 may be formed to protrude outwardly at one side of the third long side surface 520 and the third extending surface 530, and may consist of protruding surfaces connected to the third long side surface 520, the third extending surface 530 and the third base surface 510. The third protruding part 540 may provide for a space for receiving the circuit module 200 having the connector 210 together with the second protruding part 440. Here, the third protruding part 540 may have third fastening hooks 541 formed in protruding surfaces for coupling the second protruding part 440 and the third protruding part 540 to each other. The third fastening hooks 541 may be engaged with the second rib holes (441a of FIG. 2) of the second case 400.

Meanwhile, the third case 500 may further include a barrier wall 550 formed at a portion of a contact area between the first case 300 and the third case 500, that is to a portion of the third protruding part 540. The barrier wall 550 may prevent the circuit module 200 accommodated in the third protruding part 540 from moving toward the battery cell 100.

The aforementioned battery pack 10 may be completed by attaching a label.

Figure 7:
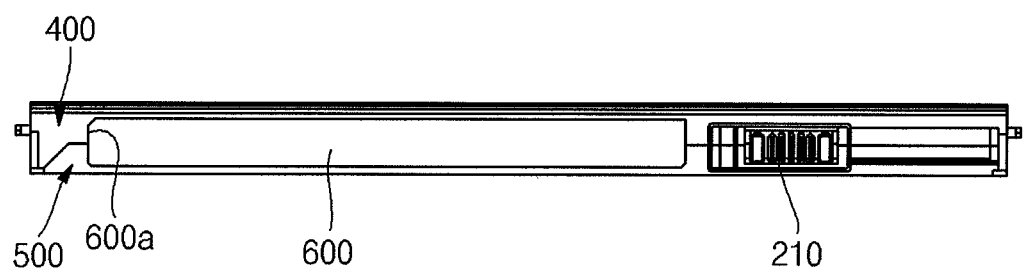
FIG. 7 illustrates a label attached to second and third cases of the battery pack shown in FIG. 4.

FIG. 7 illustrates a label attached to second and third cases of the battery pack shown in FIG. 4.

Referring to FIG. 7, the battery pack 10 may further include a label 600 attached to a label receiving groove 600a formed by a portion of a coupling line of the second case 400 and the third case 500, that is, a second label receiving groove (425 of FIG. 4) of the second case 400 and a third label receiving groove (525 of FIG. 4) of the third case 500.

Because the label 600 is attached to the label receiving groove 600a in a manner that it is received in the label receiving groove 600a, the thickness of the battery pack 10 is not increased by the label 600. The label 600 may be implemented by an attachable sticker having information concerning the battery pack 10 printed thereon.

As described above, because the battery pack 10 according to an embodiment of the present invention includes the first case 300 having a seamless, continuous side surface, the second case 400 and the third case 500, coupling lines are not revealed when the battery pack 10 is mounted in an external electronic device, thereby offering a neat exterior appearance design to the external electronic device.

In addition, in the battery pack 10 according to an embodiment of the invention, because the first case 300 having a complicated structure and the third case 500 are separately formed and then coupled to each other, a mold can be easily separated from the first case 300 even after injection-molding the first case 300.

Although the present invention has been described with reference to certain embodiments thereof, it will be understood by those skilled in the art that a variety of modifications and variations may be made to the present invention without departing from the spirit or scope of the present invention defined in the appended claims, and their equivalents.

What is claimed is:

1. A battery pack comprising:
   a battery cell;
   a circuit module electrically connected to the battery cell;
   a first case covering one side of the battery cell;
   a second case covering an opposite side of the battery cell and one side of the circuit module, wherein the second case is coupled to the first case; and
   a third case covering an opposite side of the circuit module, wherein the third case is coupled to the first case and the second case wherein the second and third cases define an internal wall that is interposed between the circuit module and the battery cell wherein the internal wall that is interposed between the circuit module and the battery cell includes a portion of the second and third cases that are interposed between the circuit module and the battery cell.

2. The battery pack of claim 1, wherein the first case comprises a continuous side surface.

3. The battery pack of claim 2, wherein a side surface of the first case is exposed when the battery pack is mounted in an external electronic device.

4. The battery pack of claim 1, wherein a coupling line that couples the first case and the second case is located below or above the third case.

5. The battery pack of claim 1, wherein the third case comprises a barrier wall formed at a portion of a contact region where the third case contacts the first case.

6. The battery pack of claim 1, further comprising a label attached to a portion of a coupling line that couples the second case and the third case.

7. The battery pack of claim 1, wherein the second case comprises a first protruding part formed at one side, the third case comprises a second protruding part formed at one side, the circuit module is accommodated in a protruding space formed by coupling the first protruding part and the second protruding part, and a connector of the circuit module is exposed through one side of the first and second protruding parts.

8. The battery pack of claim 1, wherein the battery cell comprises a cylindrical lithium ion battery.

9. The battery pack of claim 1, wherein the first case comprises a first fastening hole formed at a region where the first case and the second case are coupled to each other, and a first fastening protrusion formed at a region where the first case and the third case are coupled to each other.

10. The battery pack of claim 9, wherein the first case comprises:
    a first base surface;
    a first long side surface bent and extending from an edge of the first base surface;
    a first short side surface connected to the first base surface and the first long side surface;
    a first long side extending surface extending from the first long side surface;
    a first facing surface facing the first long side surface, bent and extending from an edge of the first base surface;
    and a first facing extending surface extending from the first facing surface.

11. The battery pack of claim 10, wherein the first fastening hole is formed on the first long side extending surface, and the first fastening protrusion is formed on the first facing extending surface.

12. The battery pack of claim 1, wherein the second case comprises a first fastening hook formed at a region where the second case and the first case are coupled to each other; and the second case comprises a second fastening hook and rib hole formed at a region where the second case and the third case are coupled to each other.

13. The battery pack of claim 12, wherein the second case comprises:
    a base surface;
    a long side surface bent and extending from an edge of the base surface;
    a short side surface connected to the base surface and the long side surface;
    and a protruding part protruding outwardly at one side of the long side surface and having protruding surfaces connected to the long side surface and the short side surface.

14. The battery pack of claim 13, wherein the second case comprises a label receiving groove formed in the second long side surface.

15. The battery pack of claim 13, wherein the first fastening hook is formed at the short side surface of the second case and the second fastening hook is formed at the long side surface of the second case, and the rib hole is formed in a rib surface parallel with the protruding surfaces.

16. The battery pack of claim 1, wherein the third case comprises:
    a receiving opening and a receiving hole formed at a region where the third case is coupled to the first case; and
    a fastening hole and a fastening hook formed at a region where the third case is coupled to the second case.

17. The battery pack of claim 16, wherein the third case comprises:
    a base surface;
    a long side surface extending from an edge of the base surface;
    an extending surface extending from an edge of the long side surface and forming a stepped portion with respect to the long side surface; and
    a protruding part formed to protrude outwardly at one side of the long side surface and the extending surface and consisting of protruding surfaces connected to the long side surface, the extending surface and the base surface.

18. The battery pack of claim 17, wherein the third case comprises a label receiving groove formed in the long side surface.

19. The battery pack of claim 17, wherein the receiving opening and the receiving hole are formed in the base surface of the third case, the fastening hole is formed in the extending surface of the third case, and the fastening hook is formed in the protruding surfaces.

\* \* \* \* \*